(12) United States Patent
Ishihara

(10) Patent No.: US 11,314,415 B2
(45) Date of Patent: Apr. 26, 2022

(54) STORAGE SYSTEM, STORAGE DEVICE, AND METHOD OF CONTROLLING STORAGE SYSTEM

(71) Applicant: Kioxia Corporation, Minato-ku (JP)

(72) Inventor: Takeshi Ishihara, Yokohama (JP)

(73) Assignee: Kioxia Corporation, Minato-ku (JP)

( * ) Notice: Subject to any disclaimer, the term of this patent is extended or adjusted under 35 U.S.C. 154(b) by 30 days.

(21) Appl. No.: 16/920,805

(22) Filed: Jul. 6, 2020

(65) Prior Publication Data
US 2021/0072897 A1 Mar. 11, 2021

(30) Foreign Application Priority Data

Sep. 11, 2019 (JP) .............................. JP2019-165106

(51) Int. Cl.
*G06F 3/06* (2006.01)

(52) U.S. Cl.
CPC ............ *G06F 3/0607* (2013.01); *G06F 3/061* (2013.01); *G06F 3/067* (2013.01); *G06F 3/0622* (2013.01); *G06F 3/0658* (2013.01)

(58) Field of Classification Search
CPC ...... G06F 3/0607; G06F 3/061; G06F 3/0622; G06F 3/0631; G06F 3/0658; G06F 3/0659; G06F 3/067
See application file for complete search history.

(56) References Cited

U.S. PATENT DOCUMENTS

| 10,019,168 B2 | 7/2018 | Shapiro et al. |
| 2017/0237670 A1 | 8/2017 | Puttagunta et al. |
| 2018/0302474 A1 | 10/2018 | Xu et al. |

FOREIGN PATENT DOCUMENTS

JP 2017-004506 A 1/2017

OTHER PUBLICATIONS

Shingo et al., ""KVDrive" Internet Protocol Drive for Object Storage Systems", Toshiba Review Global Edition, vol. 1, No. 2, 2015, 4 pages, http://www.toshiba.co.jp/tech/review.en/01_02/pdf/a03.pdf.

Kioxia Corporation, "Development of prototype NVMe-oF™ SSD with Ethernet connection", 2018, 4 pages, https.//business.kioxia.com/ja-jp/news/2018/20180807-1.html, (with English Machine Translation).

*Primary Examiner* — Yong J Choe
(74) *Attorney, Agent, or Firm* — Oblon, McClelland, Maier & Neustadt, L.L.P.

(57) ABSTRACT

A storage device is used in a storage system including a host computer and storage devices in which host data used by the host computer are distributed and stored. The storage device includes a host data memory section, a communication controller, and a controller. The host data memory section stores, data in a range notified by the host computer. The communication controller receives a write request to a multicast address corresponding to the range of the data stored in the host data memory section. The controller stores write data specified by the write request, in the host data memory section.

19 Claims, 17 Drawing Sheets

| RANGE | STORAGE DEVICE | MULTICAST ADDRESS |
|---|---|---|
| ... | FIRST STORAGE DEVICE THIRD STORAGE DEVICE | MULTICAST ADDRESS M1 |
| ... | FIRST STORAGE DEVICE SECOND STORAGE DEVICE | MULTICAST ADDRESS M2 |
| ... | SECOND STORAGE DEVICE THIRD STORAGE DEVICE | MULTICAST ADDRESS M3 |
| ... | ... | ... |

FIG. 5A
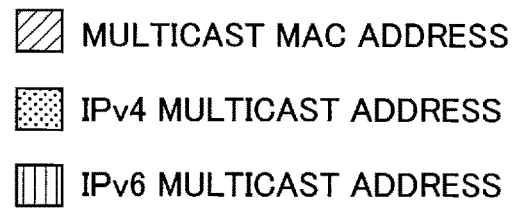
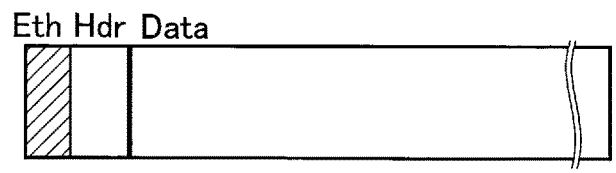
FIG. 5B
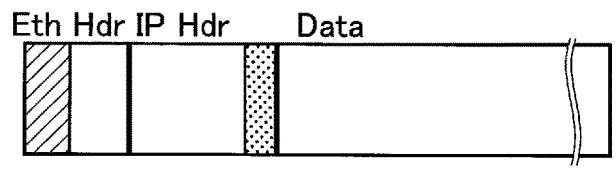
FIG. 5C
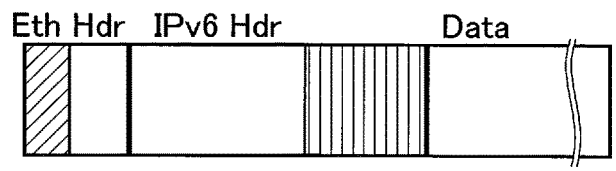
FIG. 5D
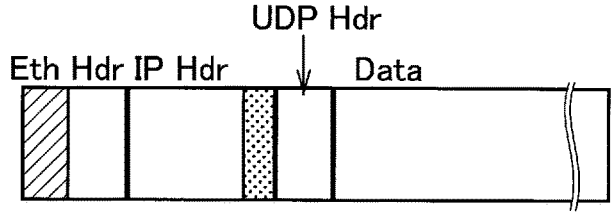
FIG. 5E
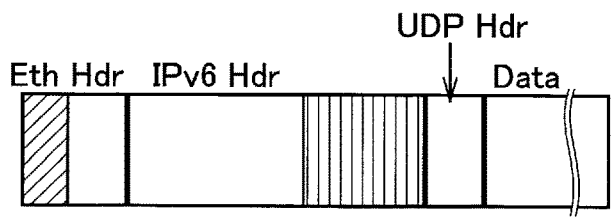

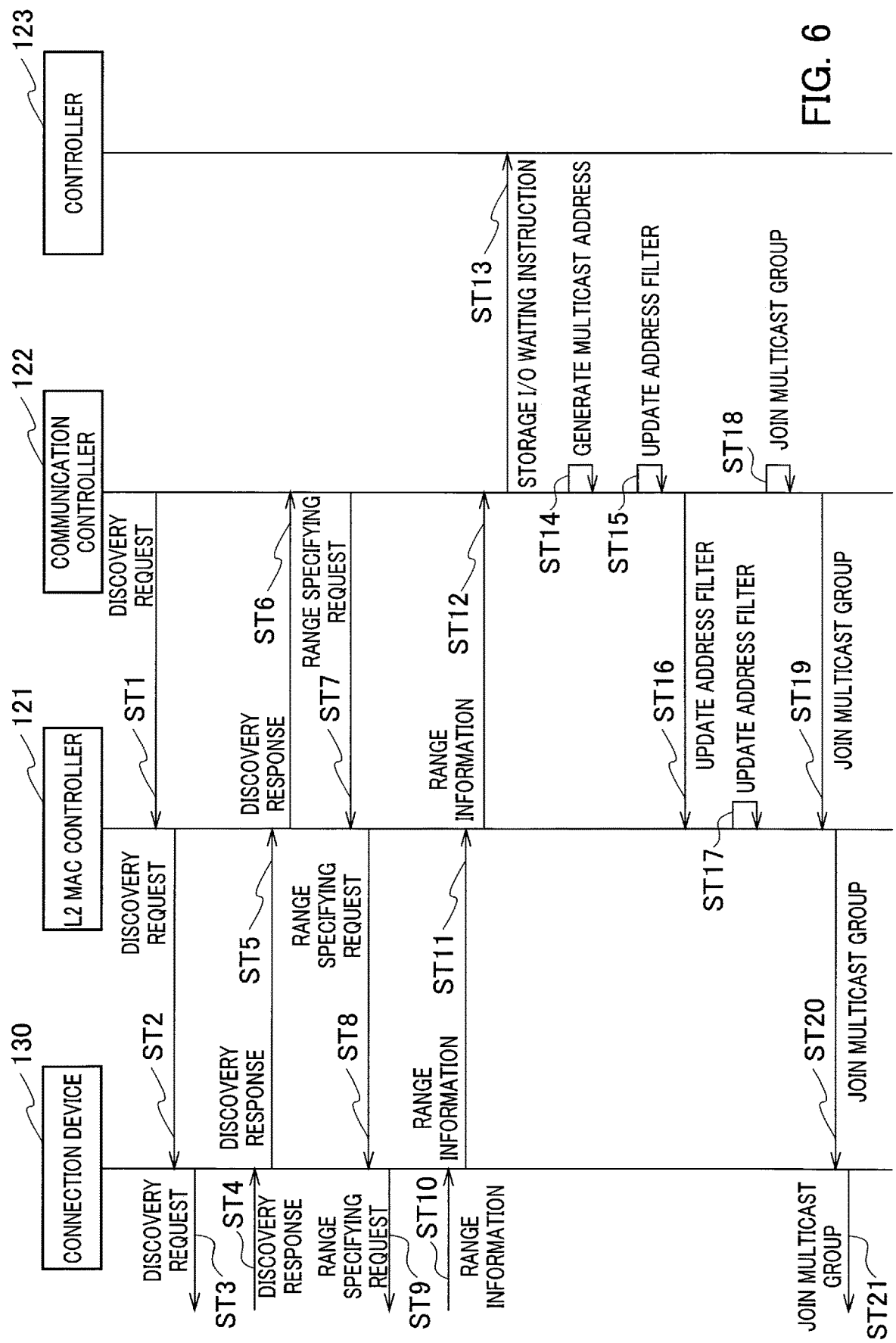

48-BIT ADDRESS

17 BITS | 23 BITS | 8 BITS

224.

01:00:5e:

48-BIT ADDRESS

8 BITS | 32 BITS | 8 BITS ff02::

| RANGE | ALLOCATION | |
|---|---|---|
| 0x0000 – 0x0FFF | S1 | 4096 PIECES |
| 0x1000 – 0x1FFF | S2 | 4096 PIECES |
| 0x2000 – 0x2FFF | S3 | 4096 PIECES |
| ..... | .... | |
| 0xF000 – 0xFFFF | S16 | 4096 PIECES |

FIG. 10B

| RANGE | ALLOCATION | |
|---|---|---|
| 0x0000 – 0x0F0E | S1 | 3855 PIECES |
| 0x1000 – 0x1F0E | S2 | 3855 PIECES |
| 0x2000 – 0x2F0E | S3 | 3855 PIECES |
| ..... | .... | |
| 0xF000 – 0xFF0E | S16 | 3855 PIECES |
| 0x0F0F – 0x0FFF<br>0x1F0F – 0x1FFF<br>0x2F0F – 0x2FFF<br>.....<br>0xFF0F – 0xFFFF | S17 | 3856 PIECES |

FIG. 15

| RANGE | X-TENANT OFFSET | Y-TENANT OFFSET | Z-TENANT OFFSET | ALLOCATION |
|---|---|---|---|---|
| 0x0000 – 0x0FFF | | | | S1 |
| 0x1000 – 0x1FFF | | | | S2 |
| 0x2000 – 0x2FFF | 0x0000 | 0x1800 | 0x3800 | S3 |
| ..... | | | | .... |
| 0xF000 – 0xFFFF | | | | S16 |

FIG. 16A

X-TENANT

| RANGE | ALLOCATION |
| --- | --- |
| 0x0000 - 0x0FFF | S1 |
| 0x1000 - 0x1FFF | S2 |
| 0x2000 - 0x2FFF | S3 |
| ..... | .... |
| 0xF000 - 0xFFFF | S16 |

FIG. 16B

Y-TENANT

| RANGE | ALLOCATION |
| --- | --- |
| 0x1800 - 0x27FF | S1 |
| 0x2800 - 0x37FF | S2 |
| 0x3800 - 0x47FF | S3 |
| ..... | .... |
| 0x0800 - 0x17FF | S16 |

FIG. 16C

Z-TENANT

| RANGE | ALLOCATION |
| --- | --- |
| 0x3800 - 0x47FF | S1 |
| 0x4800 - 0x57FF | S2 |
| 0x5800 - 0x67FF | S3 |
| ..... | .... |
| 0x2800 - 0x37FF | S16 |

| TENANT | CUE |
|---|---|
| X-TENANT | X-CUE |
| Y-TENANT | Y-CUE |
| Z-TENANT | Z-CUE |
| ... | ... |

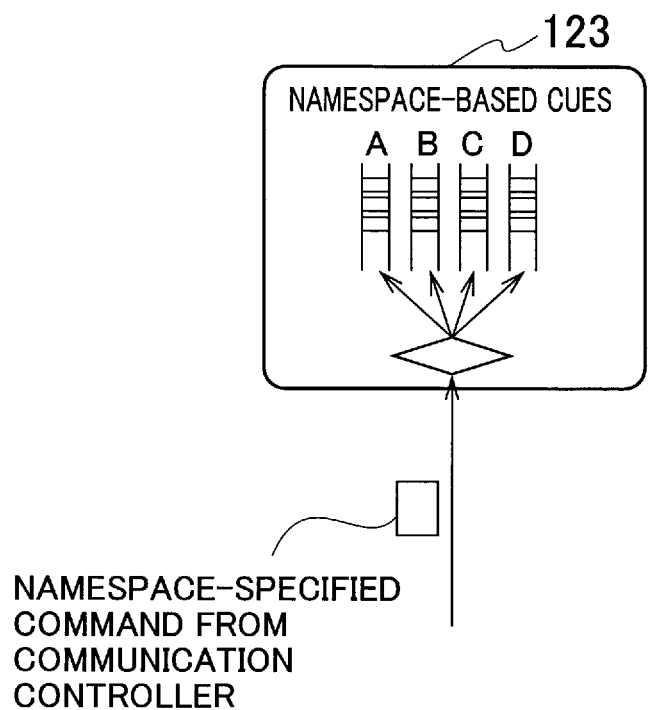

| TENANT | STORAGE MEDIUM |
|---|---|
| X-TENANT | 1,7 |
| Y-TENANT | 2,8 |
| Z-TENANT | 3,9 |
| ... | ... |

STORAGE SYSTEM, STORAGE DEVICE, AND METHOD OF CONTROLLING STORAGE SYSTEM

CROSS REFERENCE TO RELATED APPLICATIONS

This application is based upon and claims the benefit of priority from prior Japanese Patent Application P2019-165106 filed on Sep. 11, 2019; the entire contents of which are incorporated by reference herein.

FIELD

Embodiments described herein relate generally to a storage system, a storage device, and a method of controlling the storage system.

BACKGROUND

Storage systems which store data used by a computer in many storage devices are widely used in recent years. In such a storage system, the computer sends a command concerning input and output (IO) of data to any storage device. The storage device returns a response to the received command to the computer.

BRIEF DESCRIPTION OF THE DRAWINGS

FIG. 5A is a diagram illustrating a packet to an L2 multicast address according to the first embodiment.

FIG. 5B is a diagram illustrating a packet to an IPv4 multicast address according to the first embodiment.

FIG. 5C is a diagram illustrating a packet to an IPv6 multicast address according to the first embodiment.

FIG. 5D is a diagram illustrating a packet to an IPv4 multicast address including a UDP header, according to the first embodiment.

FIG. 5E is a diagram illustrating a packet to an IPv6 multicast address including a UDP header, according to the first embodiment.

FIG. 6 is a sequence chart illustrating initial processing in the first embodiment.

FIG. 10A is a diagram illustrating range examples of existing storage devices in the first embodiment.

FIG. 10B is a diagram illustrating an example of allocating parts of the ranges of the existing storage devices to a new storage device, in the first embodiment.

FIG. 15 is a diagram illustrating offset examples of tenants in the third embodiment.

FIG. 16A is a diagram illustrating ranges for a tenant including an offset in the third embodiment (X tenant).

FIG. 16B is a diagram illustrating ranges for another tenant including an offset in the third embodiment (Y tenant).

FIG. 16C is a diagram illustrating ranges for still another tenant including an offset in the third embodiment (Z tenant).

FIG. 18A is a diagram illustrating another example of the controller according to the third embodiment which includes many queues allocated to respective namespaces.

FIG. 18B is a diagram illustrating an example of allocating queues to the namespaces in the controller according to the third embodiment.

DETAILED DESCRIPTION

Figure 1:
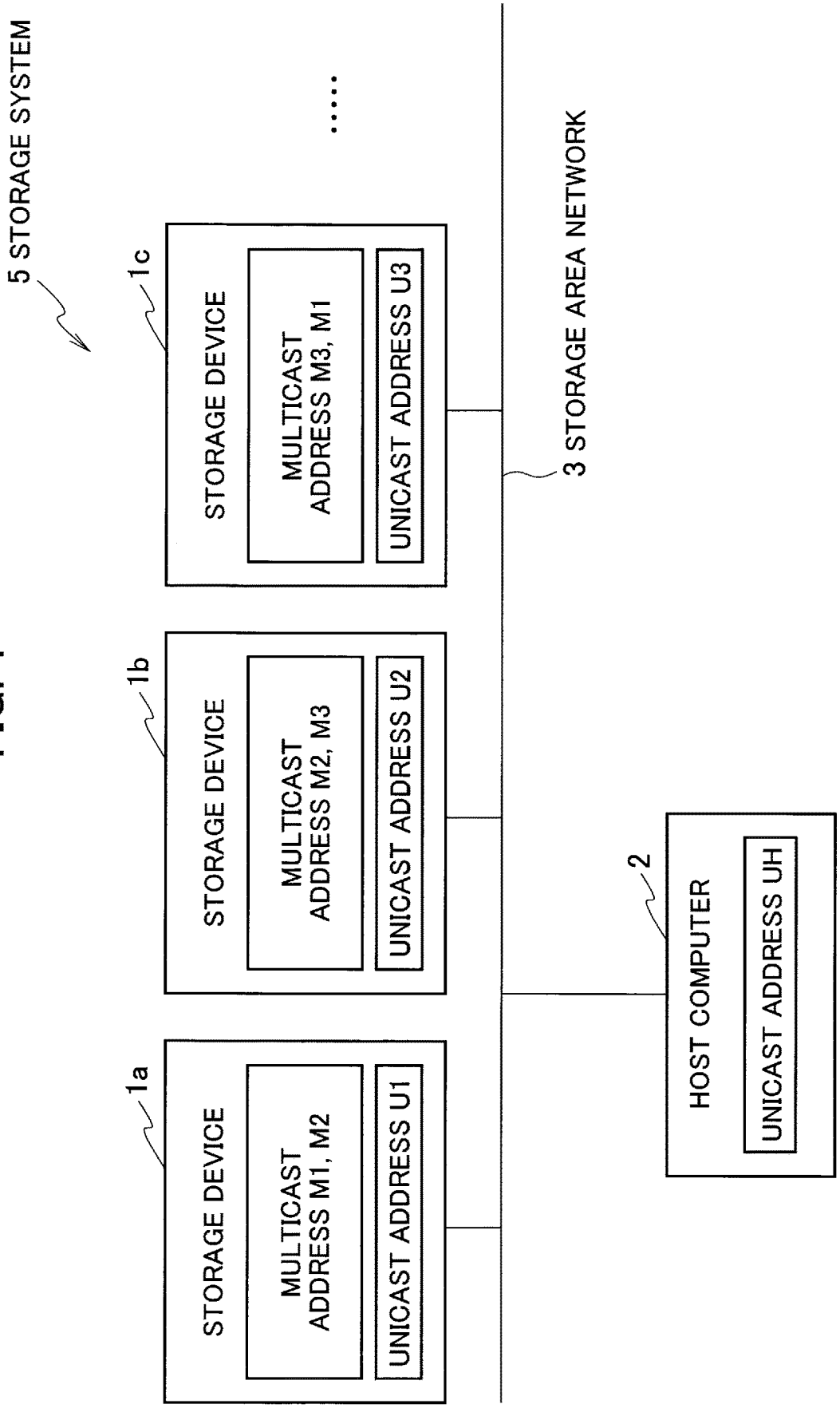
FIG. 1 is a diagram illustrating a system configuration of a storage system according to a first embodiment.

Storage devices according to embodiments relate to a storage device used in a storage system that includes: a host computer; and storage devices in which host data used by the host computer are distributed and stored. The storage device includes a host data memory section, a communication controller, and a controller. The host data memory section stores, data in a range notified by the host computer. The communication controller receives a write request to a multicast address corresponding to the range of the data stored in the host data memory section. The controller stores write data specified by the write request, in the host data memory.

The embodiments are described with reference to the drawings below. In the description of the drawings, the same portions are given the same reference numerals, and the description thereof is omitted.

First Embodiment (Storage System)

First, a storage system 5 according to a first embodiment is described with reference to FIG. 1. The storage system 5 includes storage devices and a host computer 2. The storage devices include a first storage device 1a, a second storage device 1b, a third storage device 1c, and other storage devices. The storage devices 1a, 1b, 1c, and the host computer 2 are connected through a storage area network (SAN) 3 so as to communicate with each other. The SAN 3 is a network using Ethernet (registered trademark). The SAN 3 connects to an L2 switch or a multicast router (not illustrated).

In the storage devices 1a, 1b, 1c, . . . , host data used by the host computer 2 is distributed and stored as host data segments. Each of the host data segments indicates part of the host data. In the first embodiment of the present invention, the storage devices 1a, 1b, 1c, and are able to store data different from each other but perform the same processing operations. In the first embodiment, the storage devices 1a, 1b, 1c, . . . are sometimes referred to as storage devices 1 unless necessary to be distinguished.

The host data refers to data that the host computer 2 uses in predetermined processes, such as processing of requests from client devices (not illustrated) and the like. In the first embodiment, the host data include many sets of data, such as files and data sets, used by the host computer 2. The host computer 2 instructs the storage devices 1 to perform writing or reading for some of the host data.

The storage devices 1 each include a non-volatile memory section. The storage devices 1 are solid state drives (SSDs), hard disk drives, or the like. An SSD includes: at least one NAND flash memory; and a mechanism to read and write data from the NAND flash memory, such as a NAND memory controller. A hard disk drive includes: at least one platter; and a mechanism to read and write data from the platter, such as a magnetic head.

Each of the storage devices 1 holds, a host data segment in a range notified by the host computer 2. The storage device 1 also writes or reads data in a range specified by the host computer 2 and returns the result thereof to the host computer 2.

In the storage system 5 according to the embodiments of the present invention, the host data is stored in storage devices to ensure redundancy. Each host data segment is stored in at least two storage devices 1.

The storage devices 1 may store only data in a single range specified by the host computer 2 or may store data in many ranges.

In the storage system 5 according to the first embodiment, the host computer 2 sends a write request for a predetermined range in host data to a multicast address corresponding to the write target range thereof. The range specified by the write request may be a part of the range notified to the storage device 1. Each storage device 1 having received the write request to the multicast address determines whether the multicast address in the received write request corresponds to the range of the host data segment held by the storage device 1. When the multicast address in the received write request corresponds to the range of interest, the storage device 1 writes data according to the received write request.

In the first embodiment of the present invention, the storage devices 1 are not just memory devices. The storage devices 1 each include a processing device (a central processing unit; CPU) and executes specific processing. Each storage device 1 of the storage system 5 processes the payload of a packet to the unicast address allocated to the storage device 1. Each storage device 1 further processes the payload of a packet to the multicast address corresponding to the range of the host data segment stored by the storage device 1.

In the example illustrated in FIG. 1, the first storage device 1a receives packets to multicast addresses M1 and M2 and unicast address U1 and processes the payload of each received packet. The second storage device 1b receives packets to multicast addresses M2 and M3 and unicast address U2 and processes the payload of each received packet. The third storage device 1c receives packets to multicast addresses M3 and M1 and unicast address U3 and processes the payload of each received packet.

The host computer 2 receives packets to a unicast address allocated to the host computer 2 and processes the payload of each received packet. In the example illustrated in FIG. 1, the host computer 2 receives packets to unicast address UH and processes the payload of each received packet.

In the first embodiment, the host computer 2 sends a write request over multicast. The write request sent over multicast is received by storage devices 1 configured to process the write request and is processed by the storage devices 1, thus ensuring redundancy in the storage system 5. The storage system 5 according to the first embodiment is therefore able to reduce overhead in communication in which commands are sent to the storage devices even when redundancy is ensured in the storage system 5.

(Host Computer)

Figures 2, 3:
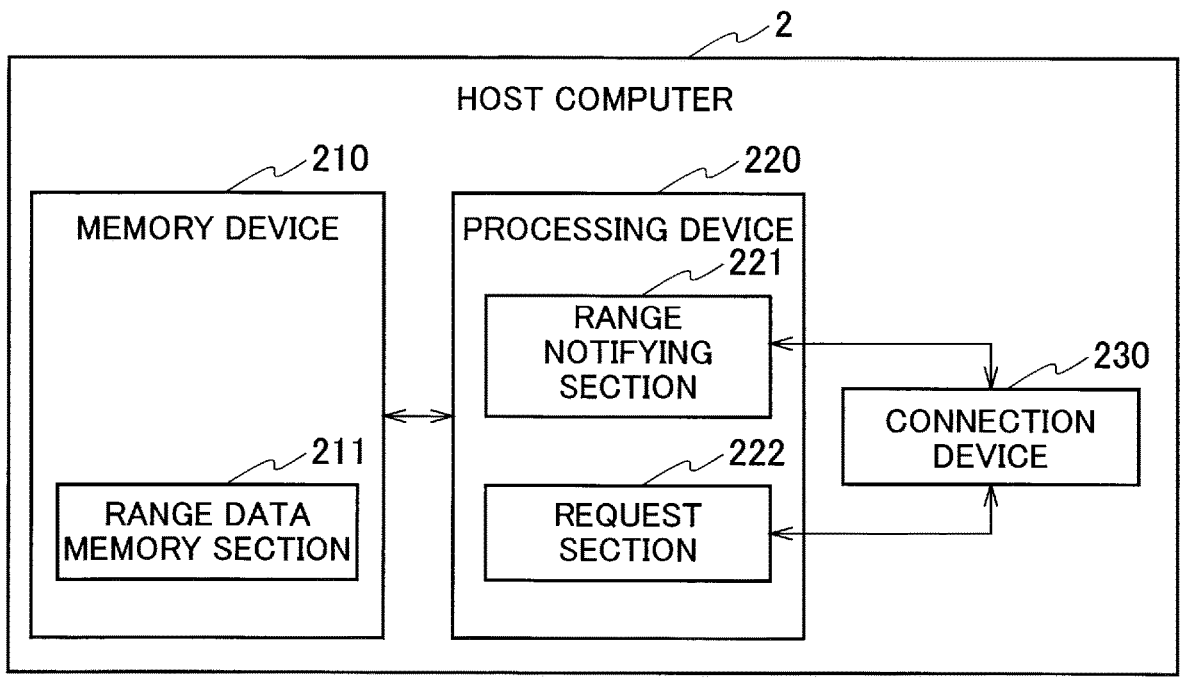
FIG. 2 is a diagram illustrating a hardware configuration and functional blocks of a host computer according to the first embodiment.
FIG. 3 is a diagram illustrating a data structure of range data according to the first embodiment and an example of the data.

With reference to FIG. 2, the host computer 2 according to the first embodiment of the present invention is described. The host computer 2 is a typical computer including a memory device 210, a processing device 220, and a connection device 230. Such a typical computer executes a host program to implement the functions illustrated in FIG. 2.

The memory device 210 is a read only memory (ROM), a random access memory (RAM), a hard disk, or the like. The memory device 210 stores various types of data including input data, output data, and intermediate data used by the processing device 220 to execute processing. The processing device 220 is a CPU. The processing device 220 reads or writes data stored in the memory device 210 or exchanges data with the connection device 230, thus executing processing in the host computer 2.

The connection device 230 physically connects to the SAN 3. The connection device 230 is an interface through which the host computer 2 connects to the storage devices 1 so as to communicate with the same. The connection device 230 is given an Ethernet media access control (MAC) address. The connection device 230 may be built in the computer or may be external. The connection device 230 may be connected to the host computer 2 by wire or wirelessly.

The memory device 210 stores the host program and includes a range data memory section 211. The range data memory section 211 is a memory region storing range data in the memory device 210.

As illustrated in FIG. 3, the range data is data which associate ranges of host data segments that the host computer 2 stores in the storage devices 1 with the storage devices 1 storing the ranges.

The method of specifying the ranges of host data segments depends on the specifications of the storage system 5 or the like. When data is managed on an address basis, like logical block addressing (LBA), for example, the host computer 2 notifies each storage device 1 of a range of data to be stored in the storage device 1 in the form of "a range of addresses". When data is managed on an object basis like a key-value store (KVS), the host computer 2 notifies each storage device 1 of a range of data to be stored in the storage device 1 in the form of "a range of object identifiers". The object identifiers are hash values calculated from actual data of objects, for example. In the storage system 5, the method of specifying the ranges of host data segments needs to be shared by the storage devices 1 and host computer 2. The method may be implemented by any process.

In the range data illustrated in FIG. 3, multicast addresses are set arbitrarily. When multicast addresses can be specified from the ranges through a predetermined logic, for example, the range data does not need to hold multicast addresses in association with the ranges. When the host computer 2 generates multicast addresses and notifies the storage devices 1 of the generated multicast addresses with the corresponding ranges, the range data holds the generated multicast addresses in association with the ranges.

In the embodiments of the present invention, the host data is stored with the redundancy ensured. As illustrated in FIG. 3, a part of host data in a predetermined range is stored in at least two of the storage devices 1.

Each range specified in the range data is associated with a multicast address. In the SAN 3, a packet to a multicast address is received by the storage device 1 associated with the multicast address, and the payload of the packet is processed. In the example illustrated in FIG. 3, a packet to multicast address M1 is received by the first and third storage devices 1a and 1c. A packet to multicast address M2 is received by the first and second storage devices 1a and 1b. A packet to multicast address M3 is received by the second and third storage devices 1b and 1c.

The processing device 220 includes a range notifying section 221 and a request section 222.

The range notifying section 221 notifies each storage device 1 of a range of the host data segment configured to be stored by the storage device 1. In this process, the range notifying section 221 notifies the ranges of the host data segments configured to be stored by the storage devices 1 so that a part of host data in a predetermined range is stored in at least two of the storage devices 1. The range notifying section 221 may specify the ranges of host data segments configured to be stored by the respective storage devices 1 in the storage system 5 with reference to the range data and notify the specified ranges to the storage devices 1. The storage devices 1 prepare to store data in the notified ranges.

The ranges of host data segments configured to be stored in the storage devices 1 are sometimes modified because of addition or removal of any storage device 1 from the storage system 5. When the ranges of host data segments configured to be stored by the storage devices 1 are modified, the range notifying section 221 notifies the storage devices of the modified ranges. Upon the modification, each storage device 1 specifies a new multicast address and modifies the setting so as to receive a packet to the new multicast address. Each storage device 1 also alters the host data segments to be stored in the storage device 1.

The request section 222 requests the storage devices 1 to write or read data. The request section 222 receives a response to the write or read request from the storage devices 1.

The request section 222 sends a write request to store write data in a target range to a multicast address corresponding to the target range. The write data refers to data to be written in any storage devices 1 upon a request from the host computer 2. At the process of writing data in any storage device 1, the request section 222 generates write data and write request data that specify a target range in which the write data is to be written. When the target range cannot be specified from the write data, the write request data include the target range. When the write target range can be specified from the write data, the write request data does not need to include the target range.

The request section 222 sets the destination of the write request to a multicast address corresponding to the target range where the write data is to be written. In the storage system 5, the storage device 1 that stores data in the target range is configured to receive a packet to the multicast address. The write request to the multicast address is processed by the storage device 1 that stores the data in the target range where the write data is stored.

The request section 222 sends a read request to read data in a target range, to the storage device 1 that stores data in the target range. The request section 222 may send a read request over unicast by specifying the address of one of the storage devices 1 or may send a read request by specifying a multicast address corresponding to the target range.

(Storage Device)

Figure 4:
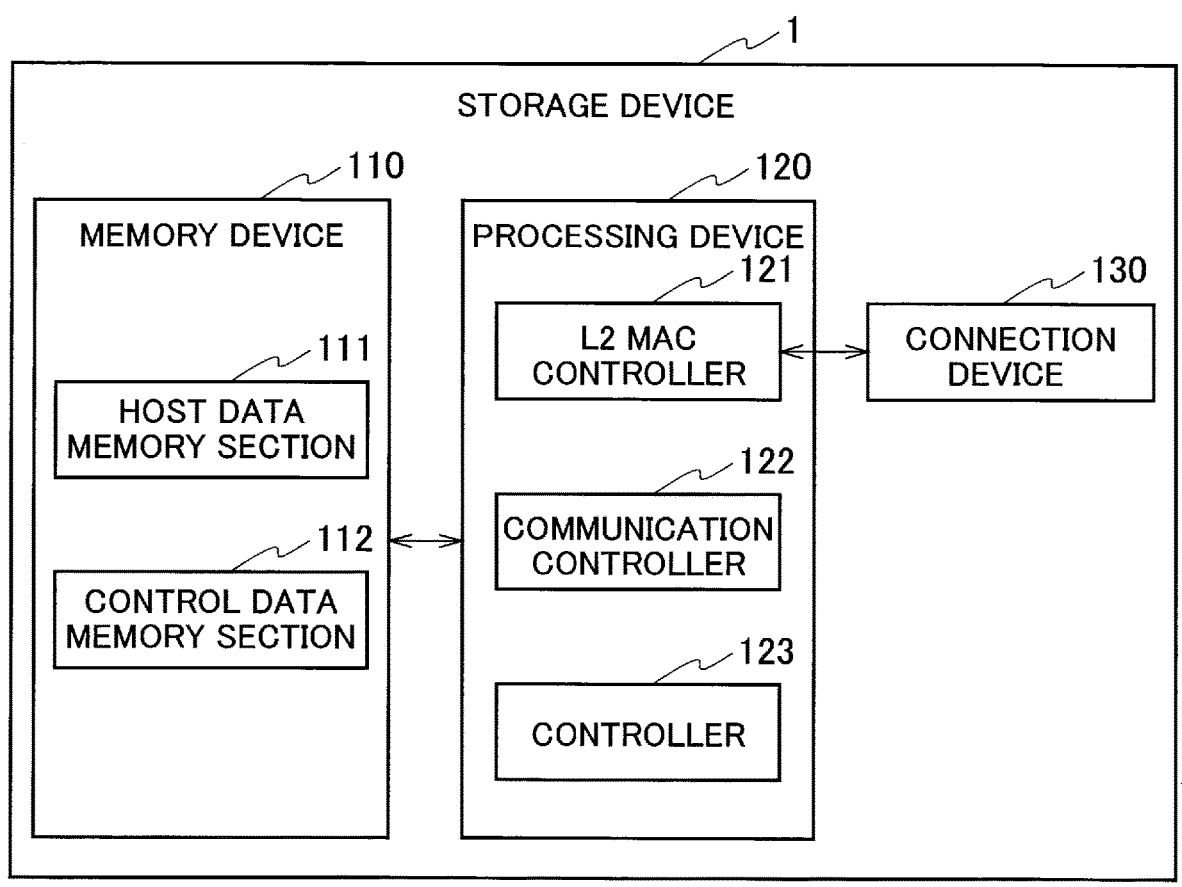
FIG. 4 is a diagram illustrating a hardware configuration and functional blocks of a storage device according to the first embodiment.

With reference to FIG. 4, the storage devices 1 according to the first embodiment of the present invention are described. Each storage device 1 is a typical computer including a memory device 110, a processing device 120, and a connection device 130. The memory device 110, processing device 120, and connection device 130 are the same as the memory device 210, processing device 220, and connection device 230 of the host computer 2 described with reference to FIG. 2, respectively. The computer executes a storage program to implement the functions illustrated in FIG. 4.

The memory device 110 illustrated in FIG. 4 may be composed of many memory media. For example, the memory device 110 may include a non-volatile memory area and a volatile memory area. The non-volatile memory area is composed of at least one memory medium, such as a NAND flash memory or a platter. The volatile memory area is composed of a memory medium, such as a RAM. The memory media included in the memory device 110 may be individually connected to the processing device 120.

The memory device 110 stores the storage program and includes a host data memory section 111 and a control data memory section 112.

The host data memory section 111 is a memory area storing host data. The host data memory section 111 stores a host data segment in the range notified by the host computer 2. The host data memory section 111 is formed in the non-volatile memory area.

The control data memory section 112 is a memory area storing control data which is data used in processing of the processing device 120. The control data includes data of a request received from the host computer 2, data of a response to be returned to the host computer 2, setting data including a cipher key, and the like. The control data memory section 112 may be formed in the non-volatile memory area or may be formed in the volatile memory area, such as a RAM. Some of the control data, such as a cipher key, may be written in a ROM before shipment.

The processing device 120 includes an L2 MAC controller 121, a communication controller 122, and a controller 123.

The L2 MAC controller 121 processes a communication protocol in the second layer (L2) of the Open Systems Interconnection (OSI) reference model. The L2 MAC controller 121 connects to the connection device 130. The L2 MAC controller 121 updates an address filter so as to receive a packet to a multicast MAC address set corresponding to the range of a host data segment configured to be stored in the host data memory section 111.

The communication controller 122 performs network processing in L2 and upper layers. The communication controller 122 exchanges packets with the host computer 2 through the SAN 3. The communication controller 122 inputs a received packet to the controller 123 and sends an output of the controller 123 to the host computer 2. The communication controller 122 updates an address filter so as to receive a packet to an IPv4/IPv6 multicast address set corresponding to the range of a host data segment configured to be stored in the host data memory section 111.

The communication controller 122 receives a write request to a multicast address corresponding to the range of the host data segment configured to be stored in the host data memory section 111 and stores the write request in the control data memory section 112. The write request stored in the control data memory section 112 is processed by the controller 123.

The communication controller 122 reads a result of the write request from the control data memory section 112 and sends a response to the write request, to the unicast address of the host computer 2. The result of the write request is stored in the control data memory section 112 by the controller 123. When receiving a write request to a multicast address not corresponding to the range of the host data segment configured to be stored in the host data memory section 111, the communication controller 122 discards the write request.

The communication controller 122 receives a read request to the unicast address of the storage device 1 from the host computer 2 and stores the read request in the control data memory section 112. The read request stored in the control data memory section 112 is processed by the controller 123.

The communication controller 122 acquires data read from the control data memory section 112 upon the read request and sends the response to the read request to the unicast address of the host computer 2. The response to the read request is stored in the control data memory section 112 by the controller 123.

In the case described in the first embodiment, the host computer 2 sends a read request to any one of the storage devices 1 over unicast. However, the present invention is not limited to such a case. The host computer 2 may send a read request over multicast, for example. In this case, the communication controller 122 may be configured to receive a request to a multicast address corresponding to the range of the host data segment configured to be stored in the host data memory section 111, from the host computer 2 and store the read request in the control data memory section 112.

The controller 123 controls writing or reading for the host data memory section 111. With reference to the packet stored from the communication controller 122 to the control data memory section 112, the controller 123 writes data in the host data memory section 111 or extracts data from the host data memory section 111.

When notified of the range of the host data segment configured to be stored in the storage device 1 by the host computer 2, the controller 123 performs processing so that the host data memory section 111 can store data in the notified range. When the host data memory section 111 is allowed to store data in the notified range, the controller 123 waits for a write or read request to be received.

The controller 123 reads the write request from the control data memory section 112 and stores the write data specified by the write request, in the host data memory section 111. The controller 123 stores in the control data memory section 112, the result of storing the write data in the host data memory section 111 and instructs the communication controller 122 to send a response to the host computer 2.

The controller 123 reads the read request from the control data memory section 112 and reads data in the range specified by the read request from the host data memory section 111. The controller 123 stores the read data in the control data memory section 112 and instructs the communication controller 122 to send a response to the host computer 2.

(Packet)

Packets to multicast addresses which are received by the storage devices 1 according to the first embodiment are described with reference to FIGS. 5A to 5E.

FIG. 5A illustrates a packet to an L2 multicast address. In the Ethernet header thereof, a multicast MAC address is set. The connection device 130 inputs a received packet to the L2 MAC controller 121. When the Ethernet header inputted from the connection device 130 does not include any multicast MAC address that matches the address filter of the L2 MAC controller 121, the L2 MAC controller 121 discards the inputted packet. When the Ethernet header inputted from the connection device 130 includes any multicast MAC address that matches the address filter of the L2 MAC controller 121, the L2 MAC controller 121 inputs the inputted packet to the communication controller 122. The communication controller 122 processes the packet inputted from the L2 MAC controller 121.

FIG. 5B illustrates a packet to an IPv4 multicast address. In the Ethernet header thereof, a multicast MAC address is set. In the IPv4 header thereof, an IPv4 multicast address is set. The connection device 130 inputs a received packet to the L2 MAC controller 121. When the Ethernet header inputted from the connection device 130 does not include any multicast MAC address that matches the address filter of the L2 MAC controller 121, the L2 MAC controller 121 discards the packet. When the Ethernet header inputted from the connection device 130 includes a multicast MAC address that matches the address filter of the L2 MAC controller 121, the L2 MAC controller 121 inputs the packet to the communication controller 122.

When the IP header of the packet inputted from the L2 MAC controller 121 does not include any IPv4 multicast MAC address that matches the address filter of the communication controller 122, the communication controller 122 discards the packet. When the IP header of the packet from the L2 MAC controller 121 includes an IPv4 multicast MAC address that matches the address filter of the communication controller 122, the communication controller 122 processes the data part of the packet.

FIG. 5C illustrates a packet to an IPv6 multicast address. In the Ethernet header, a multicast MAC address is set. In the IPv6 header, an IPv6 multicast address is set. The packet illustrated in FIG. 5C is processed in the same way as the packet illustrated in FIG. 5B.

FIGS. 5D and 5E are a packet to an IPv4 multicast address and a packet to an IPv6 multicast address, respectively. Each packet includes a user datagram protocol (UDP) header. The packets illustrated in FIGS. 5D and 5E are processed in the same way as the packets illustrated in FIGS. 5B and 5C, respectively. The communication controller 122 processes the data part of each packet when the port set in the UDP header matches a port specified in advance.

(Initial Processing)

The following description is given of processing executed until the host computer 2 is able to send a packet to the storage devices 1 over multicast after the storage devices 1 are activated, as initial processing.

When any storage device 1 is activated, the communication controller 122 thereof attempts to connect to the host computer 2 through the SAN 3 by any method. The storage device 1 may attempt to connect to an identifier set in advance. The storage device 1 may discover the host computer 2 by using a dynamic topology discovery protocol in the second layer, such as the Link Layer Discovery Protocol (LLDP) or a dynamic service discovery protocol in the third or upper layer, such as the Simple Service Discovery Protocol (SDP). Alternatively, the host computer 2 may be configured to discover the storage devices 1. The storage devices 1 response to the discovery by the host computer 2. Generally, a device having executed discovery processing starts communication after the discovery. When any storage device executes discovery processing, the storage device 1 attempts to connect to the host computer 2. When the host computer 2 executes discovery processing, the host computer 2 attempts to connect to the storage device 1.

The discovery processing enables one-to-one communication between the storage device 1 and host computer 2. The storage device 1 and host computer 2 thereby recognize each other. The unicast address used in one-to-one communication may be dynamically determined before discovery processing between the storage device 1 and host computer 2 or may be statically determined before the storage device 1 is activated. In the case of dynamically determining a MAC address, MAC address including local bits is used. In the case of dynamically determining an IPv4 address, the Dynamic Host Configuration Protocol (DHCP) or Auto IP is used. In the case of dynamically determining an IPv6 address, the DHCPv6 or Stateless Address Autoconfiguration is used.

When any storage device 1 and host computer 2 are enabled to perform one-to-one communication therebetween, the host computer 2 notifies to the storage device 1, a range of the host data segment to be stored in the storage device 1. The communication controller 122 specifies a write request to be received by the storage device 1, for the range notified by the host computer 2. Specifically, the communication controller 122 generates a multicast address corresponding to the notified range and performs processing to join a multicast group corresponding thereto. The generated multicast address depends on the multicast protocol used in the storage system 5. The multicast address is of L2 or L3 multicast, for example. In the case of L2 multicast, the communication controller 122 generates a multicast MAC address. In the case of L3 multicast, the communication controller 122 generates an IPv4 or IPv6 multicast address and a multicast MAC address corresponding thereto.

The communication controller 122 notifies the generated multicast MAC address to the L2 MAC controller 121. The L2 MAC controller 121 modifies internal conditions so as to receive a MAC frame including the notified multicast MAC address as the destination address. When the L2 MAC controller 121 includes an address filter, for example, the L2 MAC controller 121 modifies the setting thereof so as to receive a MAC frame including the notified address. In the case of using L3 multicast, the communication controller 122 notifies the MAC address to the L2 MAC controller 121. The communication controller 122 then generates a packet indicating a message to join the multicast group and sends the packet to the SAN 3. The packet indicating the message to join the multicast group includes Internet Group Management Protocol (IGMP) Membership Report or the like in the case of IPv4 and includes Multicast Listener Discover (MLD) Listener Report or the like in the case of IPv6.

The message to join a multicast group sent to the network, such as an IGMP Membership Report or MLD Listener Report massage, is processed by the L2 switch or multicast router that constitutes the network. The L2 switch performs IGMP snooping, MLD snooping, and processing of the IGMP/MLD protocol in the multicast router. The L2 switch thereby sends a multicast frame with a multicast address to a network port (a network cable) to which the storage device 1 of interest connects.

In the case described above, the communication controller 122 generates a multicast address. However, the present invention is not limited thereto. The host computer 2 may generate a multicast address and notify the generated multicast address to the storage device 1, for example.

With reference to FIG. 6, the initial processing is described. In FIG. 6, any storage device 1 sends a discovery request. The processing illustrated in FIG. 6 is just an example, and the present invention is not limited thereto.

In step ST1, the communication controller 122 inputs a discovery request destined to the host computer 2, to the L2 MAC controller 121. In step ST2, the L2 MAC controller 121 inputs the discovery request to the connection device 130. In step ST3, the connection device 130 sends the discovery request to the SAN 3.

When the connection device 130 receives a discovery response from the host computer 2 in step ST4, the connection device 130 inputs the received discovery response to the L2 MAC controller 121 in step ST5. In step ST6, the L2 MAC controller 121 inputs the discovery response to the communication controller 122.

In step ST7, the communication controller 122 inputs a range specifying request destined to the host computer 2, to the L2 MAC controller 121. The range specifying request requests the host computer 2 to specify a range of the host data segment configured to be stored in the storage device 1 of interest. In step ST8, the L2 MAC controller 121 inputs the range specifying request to the connection device 130. In step ST9, the connection device 130 sends the range specifying request to the SAN 3.

When the connection device 130 receives range information from the host computer 2 in step ST10, the connection device 130 inputs the received range information to the L2 MAC controller 121 in step ST11. In step ST12, the L2 MAC controller 121 inputs the range information to the communication controller 122.

In step ST13, the communication controller 122 inputs a storage I/O waiting instruction including the received range information, to the controller 123. The controller 123 manages the host data memory section 111 so that the host data memory section 111 can store data corresponding to the range information.

In step ST14, the communication controller 122 generates a multicast address corresponding to the received range information. Herein, when the communication controller 122 receives a multicast address corresponding to the range information from the host computer 2, the processing in step ST14 is omitted.

In step ST15, the communication controller 122 updates the address filter so as to receive a packet with the multicast address generated in step ST14. In step ST16, the communication controller 122 inputs an instruction to update the address filter to the L2 MAC controller 121. In step ST17, the L2 MAC controller 121 updates the address filter.

In the case of using only an L2 multicast address, the initial processing is terminated here. In the case of using an L3 multicast address as the multicast address, the communication controller 122 starts processing to join a multicast group in step ST18. In step ST19, the communication controller 122 inputs a request to join the multicast group to the L2 MAC controller 121. In step ST20, the L2 MAC controller 121 inputs the join request to the connection device 130. In step ST21, the connection device 130 sends the join request to the SAN 3.

(IO Request Processing)

The following describes the operation of the host computer 2 sending an IO request to the storage devices 1. The host computer 2 generates a request to write data in a predetermined range and sends the request to the SAN 3 over multicast. The data sent herein is the packet illustrated in one of FIGS. 5A to 5E.

Each storage device 1 determines whether to receive a packet, with reference to the multicast address, the port number, and the like in each header illustrated in one of FIGS. 5A to 5E. The packet determined not to be received is discarded. The packet determined to be received is stored in the control data memory section 112 by the communication controller 122. The payload part of the packet determined to be received is processed by the controller 123. When the received packet is found incorrect by a checksum error or the like, the packet is processed in accordance with general packet processing rules. When the packet cannot be corrected, the packet is discarded.

Upon being notified by the communication controller 122 of data reception, the controller 123 starts IO request processing. The controller 123 extracts an IO request stored in the control data memory section 112 and verifies the validity of the command and data thereof and the like. When the TO request is valid, the controller 123 operates the host data memory section 111 based on the previously set rules to write the write data. In order to return the response indicating whether the write data is successfully written, the controller 123 stores in the control data memory section 112, the result whether the write data is successfully written and passes the processing to the communication controller 122.

The communication controller 122 which has taken over the processing from the controller 123 generates a response packet including the result whether the write data is successfully written, which is stored in the control data memory section 112, and sends the generated response packet to the host computer 2 as the source of the write request. The sending process is preferably performed over unicast not over multicast. The source MAC address and IP address are set to unicast addresses allocated to the source storage device 1.

When the command is "read", the controller 123 extracts data in the specified range from the host data memory section 111. To return the read data as a response, the controller 123 stores the read data in the control data memory section 112 and passes the processing to the communication controller 122. The communication controller 122 having taken over the processing from the controller 123 extracts the read data from the control data memory section 112 and generates a response packet including the read data. The communication controller 122 sends the response packet to the source host computer 2.

In the above description on the read request, the read request is received over multicast in the same manner as the write request. The present invention is not limited thereto. The host computer 2 may send a read request to a particular storage device 1 among some redundant storage devices 1 over unicast. The storage devices 1 according to the embodiments of the present invention also performs a proper receiving process for such a request and returns a response.

In addition, the response from the storage device 1 to the host computer 2 is sent over unicast in the above description but may be sent over multicast. In this case, the packet to a multicast address is sent to storage devices and host computer 2. Each storage device 1 may be configured to execute some processing, including stopping the responding process, when receiving the response from another storage device 1.

Figure 7:
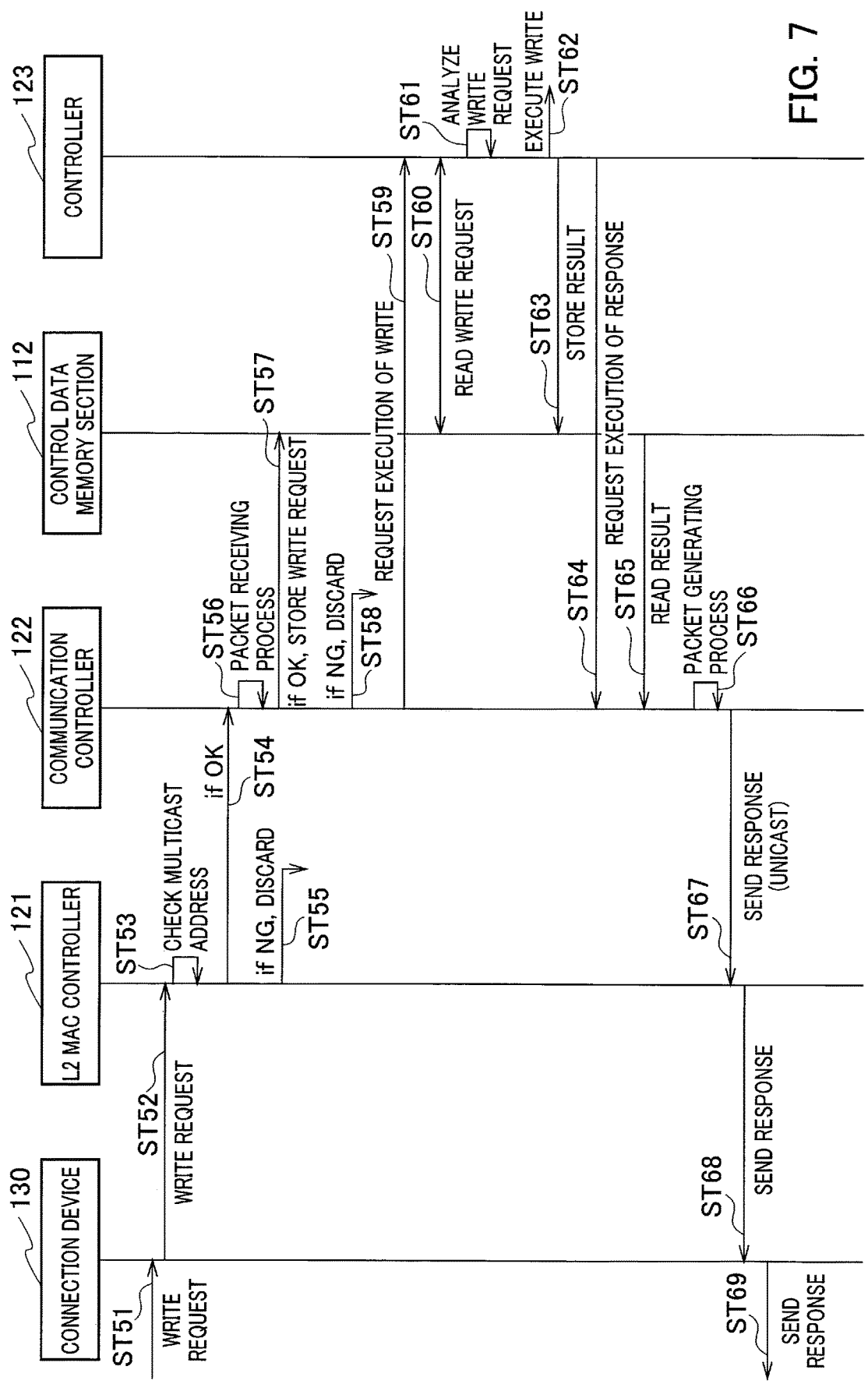
FIG. 7 is a sequence chart illustrating IO request processing in the first embodiment.

With reference to FIG. 7, the following describes processing upon receiving an IO request. FIG. 7 illustrates processing of the storage device 1 receiving a request to write data in a predetermined range, from the host computer 2. The processing illustrated in FIG. 7 is just an example, and the present invention is not limited thereto.

When receiving a write request from the host computer 2 in step ST51, the connection device 130 inputs the received write request to the L2 MAC controller 121 in step ST52. In step ST53, the L2 MAC controller 121 confirms the multicast MAC address of the received write request. When the multicast MAC address matches the address filter set in advance, the L2 MAC controller 121 inputs the write request to the communication controller 122 in step ST54. When the multicast MAC address does not match the address filter set in advance, the L2 MAC controller 121 discards the write request in step ST55.

In step ST56, the communication controller 122 checks the IPv4 (IPv6) multicast address of the received write request. When the IPv4 (IPv6) multicast address of the received write request matches the address filter set in advance, the communication controller 122 stores the write request in the control data memory section 112 in step ST57. When the IPv4 (IPv6) multicast address of the received write request does not match the address filter set in advance, the communication controller 122 discards the write request in step ST58.

In step ST59, the communication controller 122 requests the controller 123 to execute the IO request. The controller 123 reads the write request from the control data memory section 112 in step ST60. The controller 123 analyzes the write request in step ST61 and executes the write request in step ST62.

In step ST63, the controller 123 stores the result of the write request in the control data memory section 112. In step ST64, the controller 123 requests the communication controller 122 to return a response including the result of the write request.

In step ST65, the communication controller 122 reads the result of the write request from the control data memory section 112. In step ST66, the communication controller 122 generates a response packet including the result of the write request.

In step ST67, the communication controller 122 inputs to the L2 MAC controller 121, a request to send the response packet to the host computer 2. In step ST68, the L2 MAC controller 121 inputs the response packet to the connection device 130. In step ST69, the connection device 130 sends the packet destined to the host computer 2 to the SAN 3.

(Multicast Address Determination Method)

The following describes the method of determining a multicast address used in the embodiments of the present invention. The determination method is selected from two major types, central management type or autonomous type.

In the central management type, the host computer 2 generates multicast addresses corresponding to the ranges of host data segments, for example. The host computer 2 notifies the ranges of host data segments and multicast addresses generated for the ranges to the respective storage devices 1 configured to store the corresponding host data segments.

In the autonomous type, each storage device 1 and the host computer 2 determine multicast addresses based on the range information. In this case, each storage device 1 and the host computer 2 share the method of determining multicast addresses.

First, a method of deriving multicast addresses from keys in KVS is described.

In the case of directly setting a MAC address, any hash function is applied to the key to round the key to 23 bits. The result of rounding is mapped to the lower 23 bits of a multicast MAC address starting with 01:00:5E.

In the case of setting an IPv4 multicast address, any hash function is applied to the key to round the key to 28 or 23 bits. The result of rounding is added to prefix 0xE0000000 of the IPv4 multicast address, thus generating a multicast MAC address. When the key is rounded to 23 bits, the most significant bits are set to 0. It is desirable to avoid addresses already reserved by another protocol. In such a case, any special rule is applied to avoid already reserved addresses, such as adding 1 to the end.

When the multicast MAC address is generated from the IPv4 multicast address and the key is rounded to 24 or 28 bits, the multicast MAC address cannot be uniquely determined and is determined according to a predetermined rule.

In the case of setting an IPv6 multicast address, any hash function is applied to the key to round the key to 32 bits. The result of rounding is added to the lower 32 bits of prefix ff02:: (link local scope IPv6 multicast addresses), generating an IPv6 multicast MAC address. The intermediate bits are set to 0. Although the prefix is of link local scope above, the prefix may be ff05:: (site local scope), ff08:: (organization local scope), or the like. It is desirable to avoid addresses already reserved by another protocol or application. In such a case, any special rule is applied to avoid already reserved addresses, such as adding 1 to the end.

The lower 32 bits of the IPv6 multicast address are mapped to the lower 32 bits in a multicast MAC address starting with 33:33.

Next, a method of determining a multicast address from any address is described. In the description of the first embodiment of the present invention, "any address" is an address that specifies the range of a host data segment.

Figure 8A:
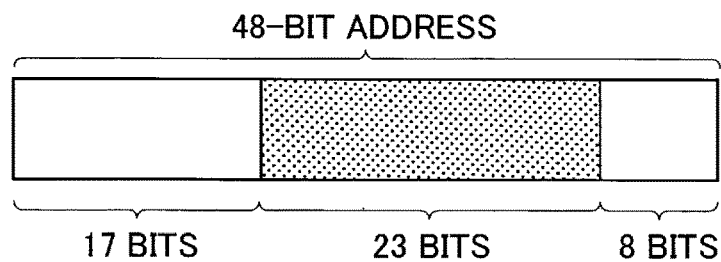
FIG. 8A is a diagram illustrating 23 bits extracted from a 48-bit address space in the first embodiment.
Figure 8B:
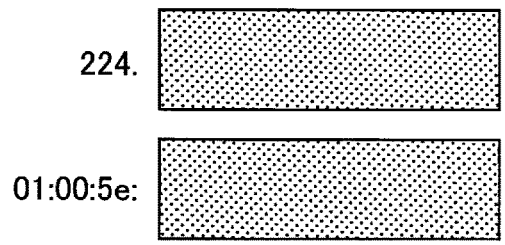
FIG. 8B is a diagram illustrating an example of generating a multicast MAC address and an IPv4 multicast address in the first embodiment.

The following describes a case of directly setting a MAC address. As illustrated in FIG. 8A, it is assumed that storage I/O is executed for a 48-bit address space, for example. As illustrated in FIG. 8B, the intermediate 23 bits thereof are extracted and are mapped to the lower 23 bits in a multicast MAC address starting with 01:00:5E, generating a multicast MAC address. An IPv4 multicast address is generated in the same manner as in the case of directly setting the MAC address.

Figure 9A:
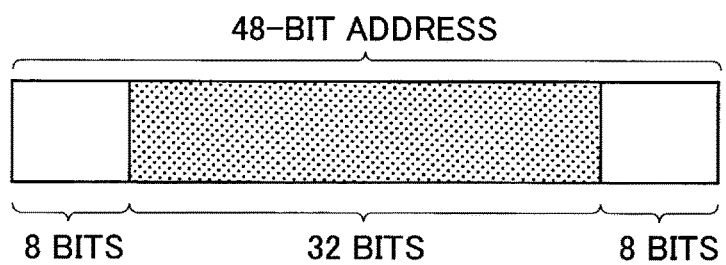
FIG. 9A is a diagram illustrating 32 bits extracted from a 48-bit address space in the first embodiment.
Figure 9B:
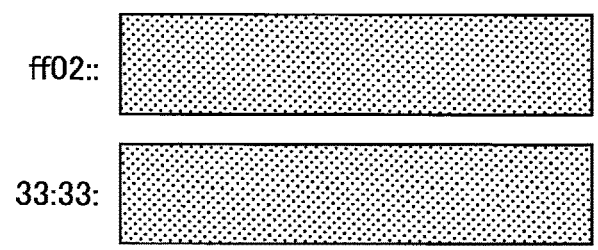
FIG. 9B is a diagram illustrating an example of generating a multicast MAC address and an IPv6 multicast address in the first embodiment.

The following describes a case of setting an IPv6 multicast address. As illustrated in FIG. 9A, it is assumed that storage I/O is executed for a 48-bit address space, for example. As illustrated in FIG. 9B, the intermediate 32 bits thereof are extracted and are mapped to the lower 32 bits of ff02::, thus generating an IPv6 multicast address. The lower 32 bits of the IPv6 multicast address are mapped to the lower 32 bits in a multicast MAC address starting with 33:33.

(Modification of Range)

In the storage system 5 of the embodiments of the present invention, adding a new storage device can increase the total capacity of the storage system 5 and expand the address space for the host data. In this process, it is necessary to reallocate the ranges managed by the storage devices 1 already connected. The following describes modification of the ranges associated with addition or removal of any storage device 1.

As described with reference to FIG. 6 and the like, when the storage devices 1 are activated, the processing to discover the host computer 2 is executed as part of initialization. When a new storage device 1 discovers the host computer 2, the host computer 2 is allowed to reallocate the ranges to the respective storage devices 1 already connected. The reallocation can be performed in various ways. The following illustrates three method examples (a) to (c):

(a) reallocating all the ranges from the beginning (b) extracting a portion of the range allocated to each storage device 1 already connected and allocating the extracted portions to the new storage device 1

(c) extracting a range corresponding to specific objects or addresses based on certain conditions from each storage device 1 already connected and allocating the extracted ranges to the new storage device 1

In the method (a), the host computer 2 divides the target space by the number of storage devices 1 including a new storage device 1 and allocates new ranges to the respective storage devices 1. Allocation is performed using a one-to-one communication path between each storage device 1 and the host computer 2. This method can cause a lot of data to be rearranged, thus significantly reducing the efficiency.

In the method (b), a portion of the range allocated to each storage device 1 which is comparatively easily divided in the light of continuity of the range, such as the top or end region of the range, is allocated to the new storage device 1. This method causes data transfer from each storage device 1 in the same manner to the method (a). However, with this method (b), the amount of data transferred is expected to be less than that of the method (a).

With reference to FIGS. 10A and 10B, the following illustrates an example in which a new storage device 1 is added when the host data is of 16-bit space. FIG. 10A illustrates allocation before the new storage device 1 is added, and FIG. 10B illustrates allocation after the new storage device 1 is added. The ranges illustrated in FIGS. 10A and 10B may be ranges of hash values of keys or addresses.

In FIG. 10A, the end of the range allocated to storage device S1 is 0x0FFF. In FIG. 10B, the end of the range allocated to storage device S1 is 0X0F0E. The range from 0x0F0F to 0x0FFF is removed from the range allocated to storage device S1. In a similar manner, the ends of the ranges allocated to existing storage devices S2 to S16 are changed.

As illustrated in FIG. 10B, the portions removed from storage devices S1 to S16 are allocated to new storage device S17. The range allocated to new storage device S17 includes the range of 0x0F0F to 0x0FFF which is removed from storage device S1, for example. Similarly, the range allocated to new storage device S17 includes the ranges removed from the existing storage devices S2 to S16, for example.

As seen from FIGS. 10A and 10B, as a storage device 1 is added, the space is fragmented. The ranges may be rearranged when needed.

The method (c) extracts a portion that matches a predetermined condition, such as a region that does not store any data, for example, from the range allocated to each storage device 1 and allocates the extracted portions to the new storage device 1. If the extracted portions that match the condition of "a region that does not store any data" provide enough capacity, the new storage device 1 can be added without moving data.

Figure 11:
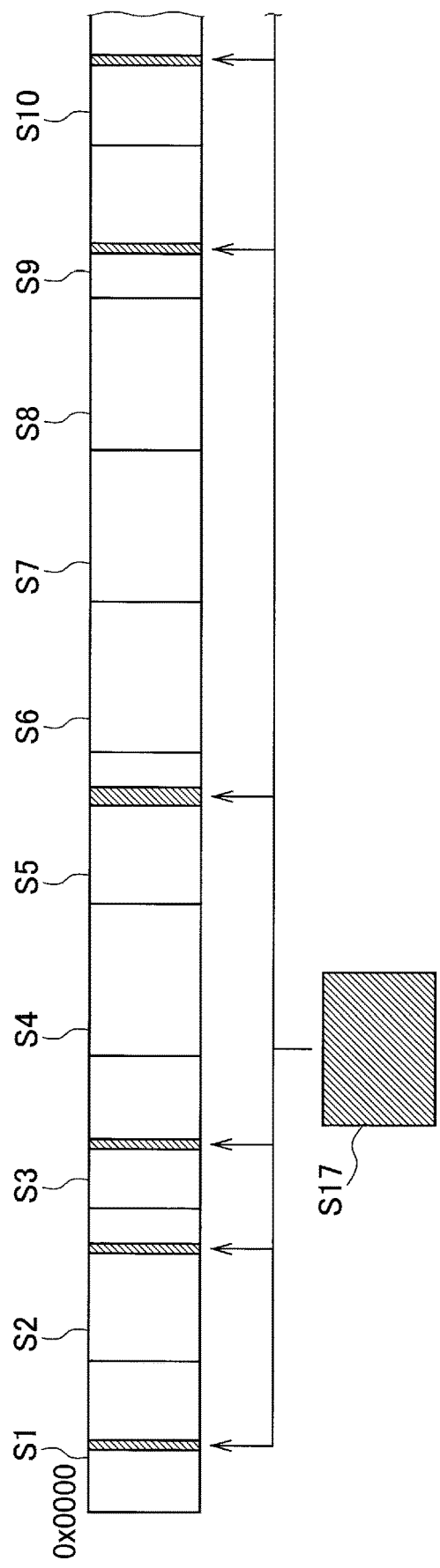
FIG. 11 is a diagram illustrating an example of allocating parts of the ranges of the existing storage devices that satisfy a predetermined condition, to a new storage device in the first embodiment.

The data space of the host data is a 16-bit ID space as illustrated in FIG. 11. Free regions of existing storage devices, including existing storage devices S1, S2, ... are indicated by diagonal lines. The portions indicated by the diagonal lines are corrected as the range of the new storage device S17.

The allocation of the ranges managed by the storage devices 1 is modified also when any existing storage device 1 is removed.

The range which has been managed by the removed storage device 1 may be allocated to the storage device 1 which manages a portion adjacent to the range of interest. For example, when the storage device S17 is removed in the example of FIG. 10B, the range of 0x0F0F to 0x0FFF is allocated to storage device S1, and the range of 0x1F0F to 0x1FF is similarly allocated to storage device S2.

When storage device S3 is removed, the range managed by storage device S3 is allocated to storage device S17, and the plural ranges originally managed by storage device S17 are integrated to the ranges managed by other storage devices 1. Although such division and integration are performed ad hoc in some cases as described above, the ranges are preferably rearranged so that the host data is fragmented as a whole.

In the above description, the range managed by the storage device 1 to be removed is allocated to the storage device 1 which manages a portion adjacent to the range of interest. However, the present invention is not limited thereto. The range managed by the storage device 1 to be removed may be allocated to another storage device 1 independently of the range of interest.

In the case of generating multicast addresses depending on the ranges of host data segments stored by the respective storage devices 1, the storage devices 1 update the address filter for multicast so as to receive packets to multicast addresses corresponding to the modified new ranges. When being notified of a new range by the host computer 2, each storage device 1 generates a new multicast address and updates the address filter in accordance with the new multicast address.

Second Embodiment

In a second embodiment, the case where packets are encrypted between each storage device 1 and host computer 2 is described.

In the first embodiment, communication between the storage devices 1 and host computer 2 is not particularly protected. Third parties are able to intercept multicast messages and acquire information read or written. One of the solutions thereof is to encrypt data before sending the data over multicast. If the strength of encryption is high enough, third parties cannot understand the contents of data even though intercepting the data. However, the host computer 2 does not distinguish the storage devices 1 which are normally operating from third parties and is at a risk of receiving a falsified response in the process of reading. The second embodiment improves this problem.

In the second embodiment, a write request to a multicast address is encrypted with a cypher key corresponding to the multicast address. The write request includes write data as a part of the host data. Since the response to a read request also includes a part of the host data, the response to the read request may be encrypted with a cypher key corresponding to the read target range. This prevents the host data from being leaked even when any third party intercepts the packets.

In the description of the second embodiment, cypher keys are common cypher keys. However, the present invention is not limited thereto and may use public key cryptography, in which each storage device 1 performs encryption with a public key and the host computer 2 performs decryption with a secret key corresponding to the cypher key.

Figure 12:
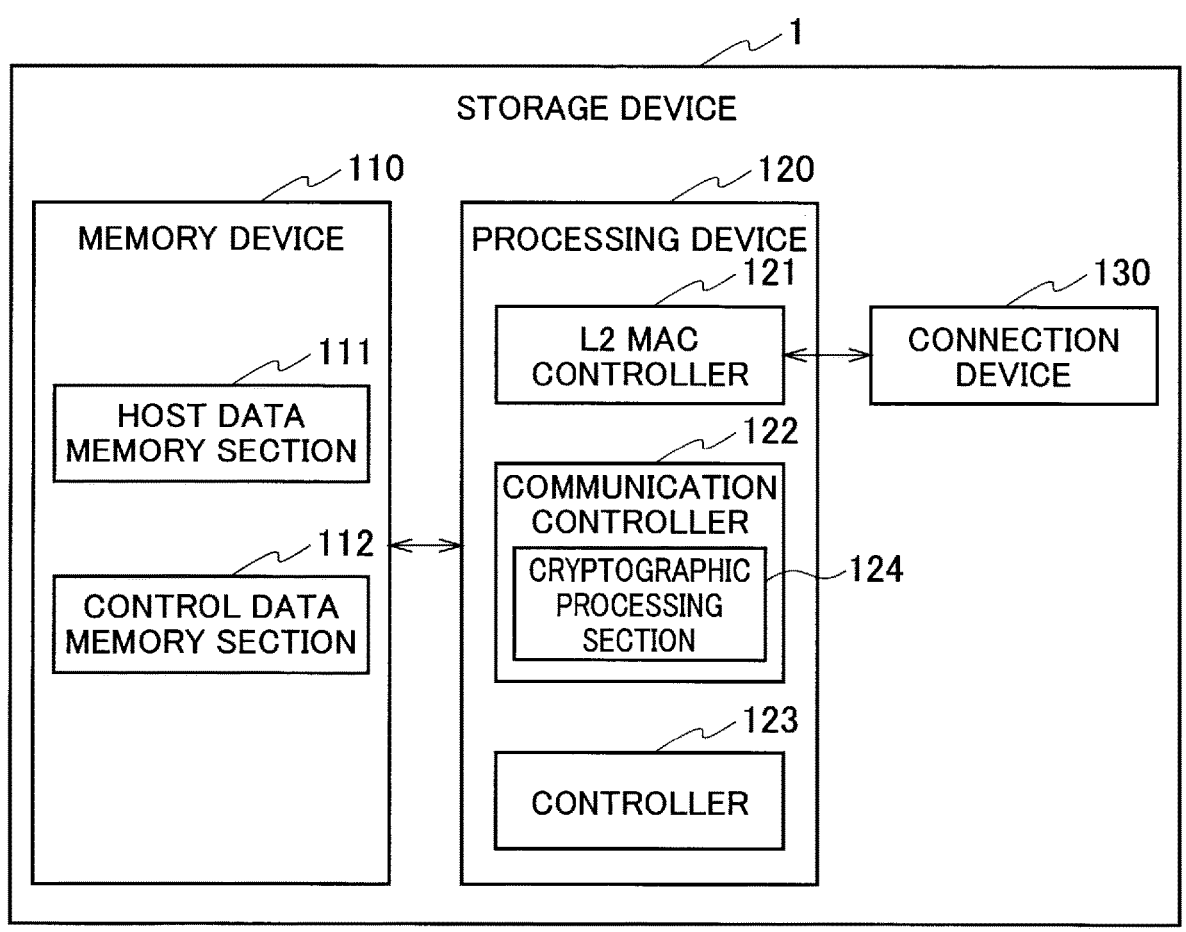
FIG. 12 is a diagram illustrating a hardware configuration and functional blocks of a storage device according to a second embodiment.

As illustrated in FIG. 12, the communication controller 122 according to the second embodiment includes a cryptographic processing section 124. The cryptographic processing section 124 decrypts a write request to a multicast address with a cypher key corresponding to the multicast address. The cryptographic processing section 124 encrypts the response to a read request to a multicast address with a cypher key corresponding to the multicast address and sends the encrypted response.

The cryptographic processing section 124 performs key management, encryption, decryption, and authentication for multicast communication including host data with the host computer 2. At initialization of each storage device 1, a multicast key distribution protocol to securely distribute cypher keys is executed between the storage device 1 and the host computer 2. This protocol is executed by the communication controller 122 or the controller 123. Examples of the key distribution protocol are "Multicast Group Management (IEEE 802.21d)", "The Group Domain of Interpretation (GDOI) (RFC6407)", and the like. These key distribution protocols are managed by the host computer 2.

The cypher keys are stored in a restricted region of the control data memory section 112. In the case of using a protocol supposed to operate with a key ring installed before shipment, the key ring is stored in a dedicated region of the memory device 110. The key ring is a bit string long enough to be a device-specific key, for example. The dedicated region is managed separately from the other data stored in the storage device 1. In order to further ensure the separation, the dedicated region may be implemented in a non-volatile storage medium physically different from that for the other data.

The basic operations in the second embodiment are the same as those of the first embodiment except that key distribution by the aforementioned key distribution protocol is performed at initialization and the keys are updated periodically.

The above description is limited to the multicast key distribution. However, the second embodiment may be configured to exchange unicast keys separately. This is implemented by using a unicast key exchange protocol, such as Internet Key Exchange (IKE).

The common cypher keys may be managed by using a Logical Key Hierarchy (LKH) technique. In this case, each storage device 1 holds some keys corresponding to respective nodes in a binary tree structure representing an LKH in FIG. 13, for example. The keys herein are device-specific secret keys. Each storage device 1 determines a key (secret information) used to encrypt messages to be sent over multicast among many keys stored as device-specific secret information.

Figure 13:
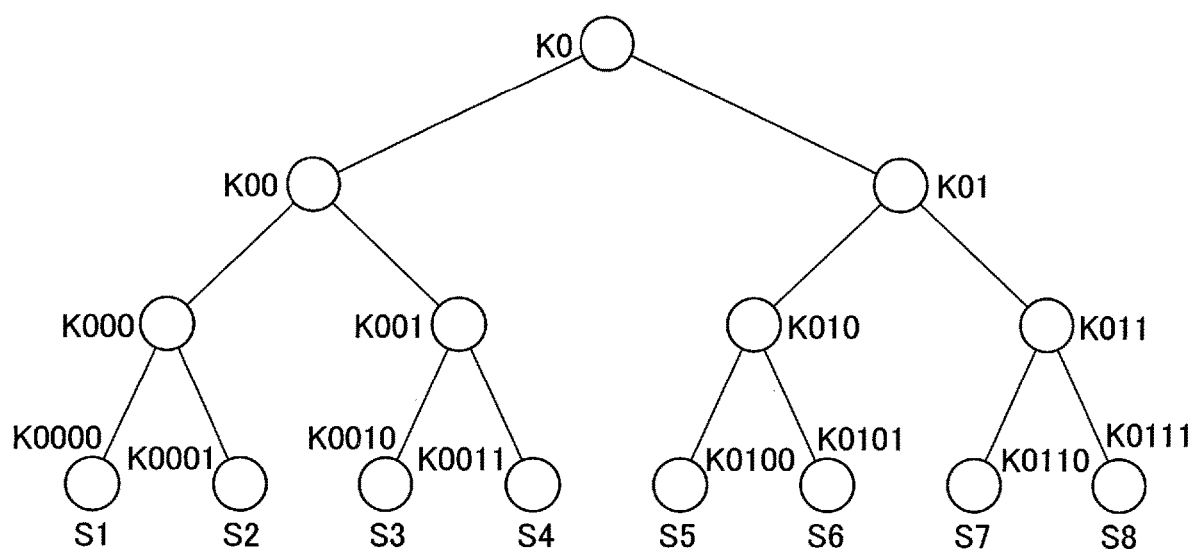
FIG. 13 is an LKH example represented in a binary tree structure in the second embodiment.

For example, it is assumed that the storage system 5 includes eight storage devices 1, for example. FIG. 13 illustrates a tree structure example based on the LKH. Second storage device S2 holds keys K0, K00, K000, and K0001 as the device-specific secret information. When a predetermined multicast group G1 includes three storage devices S1, S2, and S3, these storage devices S1, S2, and S3 decide to perform encryption using key K00, which is commonly held by the storage devices S1, S2, and S3, with the host computer 2. The storage devices S1, S2, and S3 are able to properly encrypt or decrypt messages in the multicast group G1 by managing key K00 in association with the multicast group G1.

For example, public key cryptography may be used in order that the storage devices 1 and host computer 2 securely notify to each other of meta information ("00" as the index of key K00 or the like) that specify the keys, such as keys K0 and K00.

In the second embodiment, packets to be exchanged over unicast may be encrypted. The common secret key may be specified by the LKH illustrated in FIG. 13 or may be specified by another method. In the case of using the LKH illustrated in FIG. 13, the storage device S1 can encrypt unicast communications using key K0001. Since the response to a read request received from the host computer 2 includes host data, the cryptographic processing section 124 encrypts the read data with a predetermined key and sends the same to the SAN 3.

Third Embodiment

A storage system 5' according to a third embodiment is described with reference to FIG. 14. The storage system 5' includes: storage devices 1' including a first storage device 1a', a second storage device 1b', and a third storage device 1c'; and a host computer 2'. The host computer 2' according to the third embodiment performs processing for many tenants. The following describes a case where host data are separated for the tenants.

The host computer 2' provides services for many tenants using host data. For example, the host computer 2' emulates three virtual machines, which execute processing for different tenants. Alternatively, the host computer 2' may execute many processing processes for the many tenants. The host computer 2' only needs to perform processing concerning many tenants, which may be implemented by any method.

The many tenants possibly use the storage devices 1' in accordance with different policies. This requires a function to separately perform input and output for host data concerning different tenants in each storage device 1'.

The third embodiment uses multicast communication using cryptography, which is introduced in the second embodiment, in order to separate communications performed by tenants with the storage devices 1. The block diagram of each storage device 1' according to the third embodiment is the same as described with reference to FIG. 12.

The storage system 5' illustrated in FIG. 14 includes the same devices as those of the storage system 5 illustrated with reference to FIG. 1. The storage system 5' is different from the storage system 5 in that each storage device 1' holds cypher keys and performs cryptographic processing and the host computer 2' includes many tenants.

Each storage device 1' executes initialization in conjunction with each of the many tenants processed by the host computer 2'. In this process, each storage device 1' uses a unicast address previously given to the storage device 1'. In the example illustrated in FIG. 14, the unicast address allocated to the first storage device 1a' is U1. The storage devices 1' identify the tenants by tenant identifiers set in packets.

The storage devices 1' exchange cypher keys with the host computer 2' at initialization. The cypher keys are provided for the respective tenants. Specifically, a write request to a multicast address is encrypted with a cypher key corresponding to the tenant concerning the write request. The cypher keys may be provided corresponding to not only the tenants but also multicast addresses.

Figure 14:
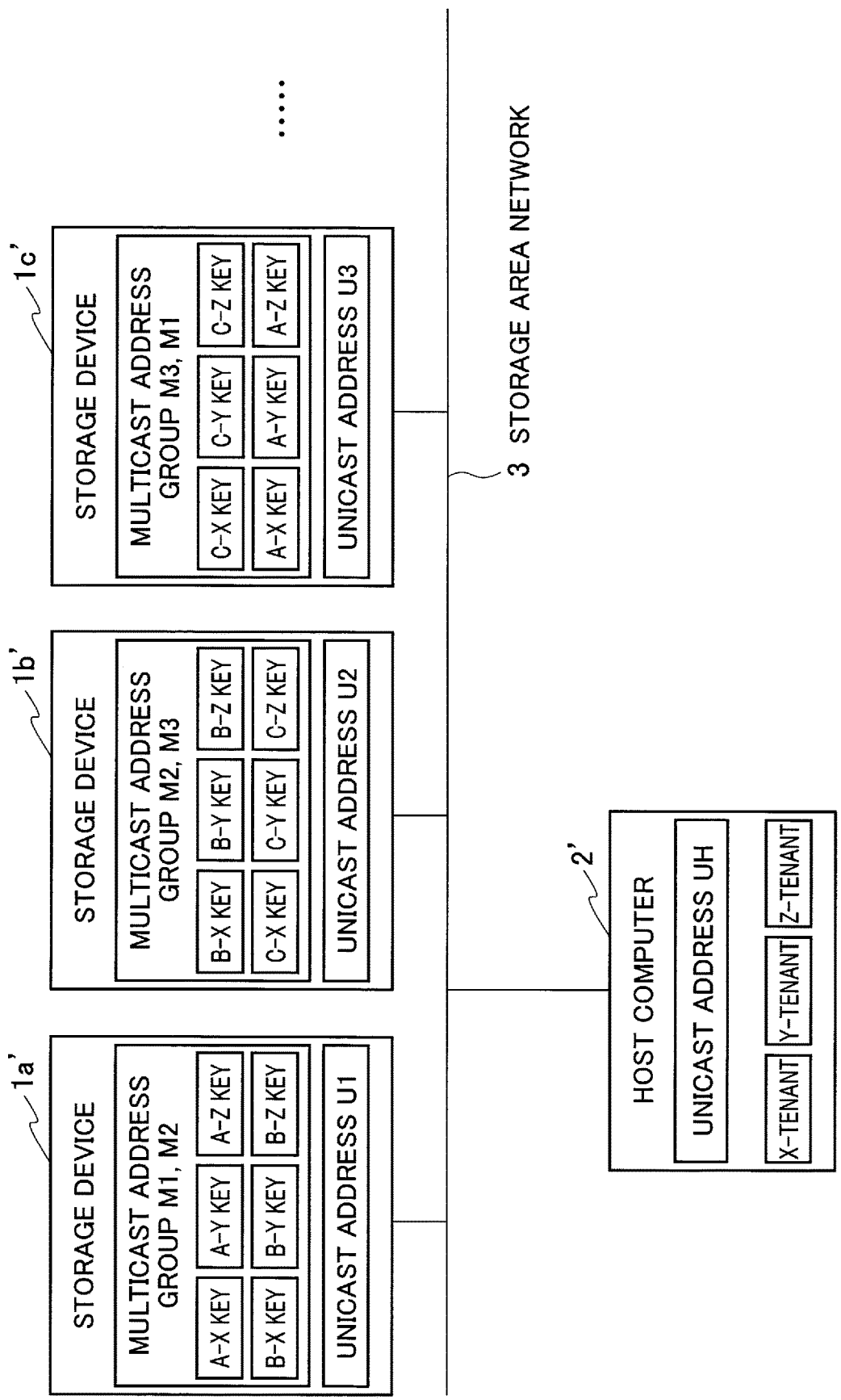
FIG. 14 is a diagram illustrating a system configuration of a storage system according to a third embodiment.

In the example illustrated in FIG. 14, the cypher keys are provided for multicast addresses and tenants. Since the first storage device 1a' receives write requests to multicast addresses M1 and M2, the first storage device 1a' holds cypher keys corresponding to multicast addresses M1 and M2 for X-tenant, Y-tenant, and Z-tenant.

The cypher keys corresponding to multicast address M1 for the tenants, used by the first storage device 1a' are cypher keys A-X, A-Y, and A-Z. Cypher key A-X is used for X-tenant related packets to multicast address M1. Cypher key A-Y is used for Y-tenant related packets to multicast address M1. Cypher key A-Z is used for Z-tenant related packets to multicast address M1.

The cypher keys corresponding to multicast address M2 for the tenants, used by the first storage device 1a' are cypher keys B-X, B-Y, and B-Z. Cypher key B-X is used for X-tenant related packets to multicast address M2. Cypher key B-Y is used for Y-tenant related packets to multicast address M2. Cypher key B-Z is used for Z-tenant packets to multicast address M2.

In a similar manner, the second and third storage devices 1b' and 1c' hold cypher keys corresponding to the tenants for the multicast addresses. The host computer 2' also holds cypher keys corresponding to the tenants for the multicast addresses.

To generate cypher keys for respective tenants, each storage device 1' and the host computer 2' hold data of the LKH tree structure illustrated in FIG. 13 for each tenant.

In addition to the unicast address allocated to each storage device 1', the storage device 1' may have unicast addresses allocated to the tenants concerning host data sent or received by the storage device 1'.

In the example illustrated in FIG. 14, the first storage device 1a' may have unicast addresses U1X, U1Y, and U1Z in addition to unicast address U1 allocated thereto. Unicast address U1X is used by the storage device 1' to perform unicast communication of packets concerning X-tenant. Unicast address U1Y is used by the storage device 1' to perform unicast communication of packets concerning Y-tenant. Unicast address U1Z is used by the storage device 1' to perform unicast communication of packets concerning Z-tenant.

In a similar manner, unicast addresses for tenants may be allocated to the second and third storage devices 1b' and 1c'. The unicast addresses for tenants allocated to each storage device 1' are notified to the host computer 2' at initialization.

At initialization, each storage device 1' uses the unicast address allocated to the storage device 1'. After initialization, each storage device 1' may use unicast addresses corresponding to the tenants concerning host data exchanged with the host computer 2'.

The host computer 2' may have unicast addresses for respective tenants. The unicast addresses for the tenants allocated to the host computer 2' are notified to each storage device 1' at initialization.

In the description of the first embodiment, multicast addresses are provided for ranges of host data segments. In the description of the third embodiment, multicast addresses may be provided for ranges of host data segments and tenants. In the case of using a communication protocol that is able to confirm identifiers even after encryption, such as UDP, in the fourth layer (L4), multicast addresses may be set for ranges of host data segments while UDP port numbers are used to identify data of tenants.

In the process of writing data as a part of host data, the range where the data is to be written is specified based on the file name of the data or the like in some cases. For example, creation dates of files are widely used as file names. Files are therefore likely to be written at the same positions across the tenants, leading to load concentration on a particular region of any storage device 1'.

To avoid such a situation, multicast groups may be adjusted to distribute accesses by the tenants through the host computer 2' as an intermediary.

As illustrated in FIG. 15, for example, the host computer 2' provides an offset value for each tenant. Each storage device 1' therefore holds sets of host data in different ranges for different tenants as illustrated in FIGS. 16A to 16C. For example, the first storage device S1 stores a range of 0x0000 to 0x0FFF for X-tenant, a range of 0x1800 to 0x27FF for Y-tenant, and a range of 0x3800 to 0x47FF for Z-tenant. The second storage device S2 or another storage device similarly holds sets of host data in different ranges for different tenants. The storage system 5' according to the third embodiment is thereby able to constitute a large-scale efficient secure storage area network with load concentration on a specific region being avoided.

At initialization, the host computer 2' notifies each storage device 1' of the range of the host data segment to be stored by the storage device 1' and offset values for respective tenants. The host data memory section 111 of the storage device 1' stores data in the range notified by the host computer 2' added by the offset value of each tenant. The storage device 1' generates multicast addresses based on the ranges notified by the host computer 2' added by the notified offset values and updates the address filter so as to receive packets to the generated multicast addresses. The communication controller 122 of the storage device 1' receives a write request to a multicast address corresponding to the range added by any offset value.

In the example described above, the host data ranges are adjusted for respective tenants in order to avoid concentration of accesses to a specific storage region. However, the present invention is not limited to this. For example, it is possible to avoid concentration of accesses by internal processing of the storage devices 1'. Examples thereof are illustrated in FIGS. 17A to 19B.

Figures 17A, 17B:
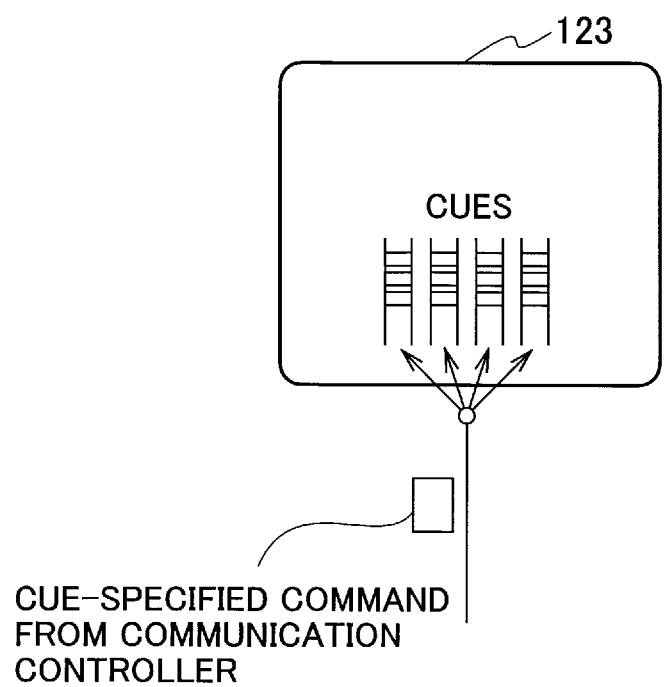
FIG. 17A is a diagram illustrating an example of a controller according to the third embodiment which includes many queues allocated to tenants.
FIG. 17B is a diagram illustrating an example of allocating queues to the tenants in the controller according to the third embodiment.

The following describes an example illustrated in FIGS. 17A and 17B. In the example illustrated in FIGS. 17A and 17B, the controller 123 of the storage device 1' provides queues to process requests from the host computer 2' for respective tenants.

The controller 123 includes a control interface in accordance with Non-volatile Memory Express (NVMe). The control interface includes at least two command queues as illustrated in FIG. 17A. The command queues are allocated to respective tenants as illustrated in FIG. 17B. The communication controller 122 inputs a command received from the host computer 2' to a proper one of the command queues based on the correspondence relationship illustrated in FIG. 17B.

In the example illustrated in FIGS. 17A and 17B, queues for accessing the host data memory section 111 are different across the tenants. Even when commands to access ranges close to each other wait at the tops of some queues, the controller 123 adjusts the processing order of the queue to distribute access to the ranges close to each other.

The following describes an example illustrated in FIGS. 18A and 18B. In FIGS. 18A and 18B, the host data memory section 111 is segmented by many namespaces, and the tenants are assigned to the respective namespaces. The controller 123 of the storage device 1' provides queues for processing requests from the host computer 2', for the respective namespaces.

The controller 123 includes a control interface in accordance with the NVMe. When the namespace function is effective in the host data memory section 111, the control interface includes command queues for respective namespaces as illustrated in FIG. 18A. The tenants are divided into groups depending on the number of namespaces, and the namespaces are allocated to the respective tenants as illustrated in FIG. 18B. The communication controller 122 inputs a command received from the host computer 2' to a proper command queue based on the allocation of the namespaces.

In the example illustrated in FIGS. 18A and 18B, queues to access the host data memory section 111 are different across the namespaces corresponding to the tenants. Even when commands that access ranges close to each other wait at the tops of some queues, the controller 123 adjusts the processing order of the queues to distribute access to the ranges close to each other.

Figures 19A, 19B:
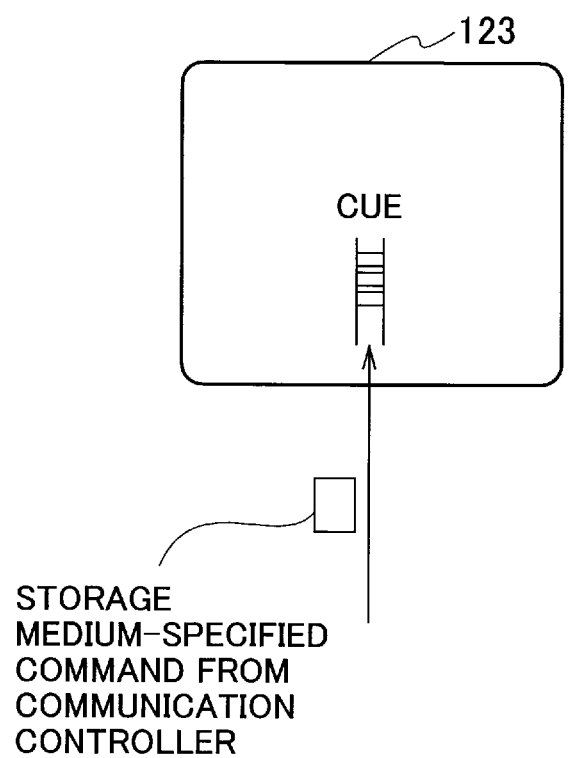
FIG. 19A is a diagram illustrating still another example of the controller according to the third embodiment which includes a single queue.
FIG. 19B is a diagram illustrating an example of specifying a storage medium to be accessed in the controller according to the third embodiment.

The following describes an example illustrated in FIGS. 19A and 19B. In the example illustrated in FIGS. 19A and 19B, the host data memory section 111 is composed of many physical storage media, and the storage media are specified for the tenants in advance. The storage media are NAND Flash memories, platters, and the like.

In the example illustrated in FIGS. 19A and 19B, the controller 123 includes a control interface which is able to directly specify the storage medium to be accessed. The control interface may directly specify a channel which is composed of many storage media. The tenants are separated into the same number of groups as the number of physical storage media (or channels) that can be specified, and each tenant is associated with identifiers of storage media as illustrated in FIG. 19B. The communication controller 122 inputs a command received from the host computer 2' to the command queue with a storage medium specified in accordance with the allocation.

In the example illustrated in FIGS. 19A and 19B, the storage media are distributed to the tenants in advance. Even when the host computer 2' successively sends requests to access ranges close to each other for the tenants, the controller 123 accesses the many storage media discretely. The controller 123 is thereby able to process many requests successively.

In the methods illustrated in FIG. 17A to 19B, the communication controller 122 is configured to know the method supported by the controller 123 in advance. The communication controller 122 issues a command requesting the controller 123 to write or read in accordance with the correspondence table illustrated in FIG. 17B, 18B, or 19B. These correspondence tables are formed at initialization by the controller 123 and are stored in the control data memory section 112. When any tenant is added or deleted, the correspondence table is updated properly in accordance with join or leave for a multicast group.

The storage system according to at least any one of the embodiments described above reduces overhead of communication through which commands are sent to storage devices.

While certain embodiments have been described, these embodiments have been presented by way of example only, and are not configured to limit the scope of the inventions. Indeed, the novel embodiments described herein may be embodied in a variety of other forms: furthermore, various omissions, substitutions and changes in the form of the embodiments described herein may be made without departing from the spirit of the inventions. The accompanying claims and their equivalents are configured to cover such forms or modifications as would fall within the scope and spirit of the inventions.

What is claimed is:

1. A storage system, comprising:
a host computer; and
storage devices, wherein
the host computer connects to the storage devices in which host data used by the host computer are distributed and stored,
the host computer includes:
a range notifying section which notifies each storage device of a range of a section of the host data to be stored by the storage device so that part of the host data in a predetermined range is stored in at least two of the storage devices; and
a request section which sends a write request to store write data in a target range, to a multicast address corresponding to the target range, and
each of the storage devices includes:
a host data memory section which stores data in the predetermined range notified by the host computer;
a communication controller which receives a write request to a multicast address corresponding to the predetermined range of the data stored by the host data memory section; and
a controller which stores the write data specified by the write request, in the host data memory section.

2. The storage system according to claim 1, wherein the communication controller sends a response to the write request to a unicast address of the host computer.

3. The storage system according to claim 1, wherein
the communication controller receives a read request to a unicast address of the storage device, from the host computer, and
the controller reads data in a range specified by the read request, from the host data memory section.

4. The storage system according to claim 3, wherein the communication controller sends a response to the read request, to the unicast address of the host computer.

5. The storage system according to claim 1, wherein the write request to the multicast address is encrypted with a cypher key corresponding to the multicast address.

6. The storage system according to claim 1, wherein
when the host computer provides services for many tenants by using the host data, the write request to the multicast address is encrypted with a cypher key corresponding to one of the tenants concerning the write request.

7. The storage system according to claim 1, wherein
when the host computer provides services for many tenants by using the host data,
the host computer notifies to the storage device, a range of the host data section to be stored in the storage device and an offset value for each tenant,
the host data memory section stores data in a range calculated by adding the offset value for each tenant to the range notified by the host computer, and
the communication controller receives a write request to a multicast address corresponding to the calculated range including the offset value.

8. A storage device used in a storage system including a host computer and storage devices, wherein
host data used by the host computer is distributed and stored in the storage devices, the storage device comprising:
a host data memory section which stores data in a range notified by the host computer;
a communication controller which receives a write request to a multicast address corresponding to the range of the data stored by the host data memory section; and
a controller which stores write data specified by the write request, in the host data memory section.

9. The storage device according to claim 8, wherein the communication controller sends a response to the write request to a unicast address of the host computer.

10. The storage device according to claim 8, wherein
the communication controller receives a read request to a unicast address of the storage device, from the host computer, and
the controller reads data in a range specified by the read request, from the host data memory section.

11. The storage device according to claim 10, wherein the communication controller sends a response to the read request, to the unicast address of the host computer.

12. The storage device according to claim 8, wherein the write request to the multicast address is encrypted with a cypher key corresponding to the multicast address.

13. The storage device according to claim 8, wherein
when the host computer provides services for many tenants by using the host data, the write request to the multicast address is encrypted with a cypher key corresponding to one of the tenants concerning the write request.

14. The storage device according to claim 8, wherein
when the host computer provides services for many tenants by using the host data,
the host computer notifies to the storage device, a range of the host data section to be stored in the storage device and an offset value for each tenant,
the host data memory section stores data in a range calculated by adding the offset value for each tenant to the range notified by the host computer, and
the communication controller receives a write request to a multicast address corresponding to the calculated range including the offset value.

15. A method of controlling a storage system including a host computer and storage devices, the method comprising:
the host computer notifying each storage device of a range of a section of host data to be stored by the storage device so that part of the host data in a predetermined range is stored in at least two of the storage devices, the host data being used by the host computer;
each of the storage devices storing data in the predetermined range, in a host data memory section, notified by the host computer;
the host computer sending a write request to store write data in a target range, to a multicast address corresponding to the target range;
the storage device receiving, by a communication controller, a write request to a multicast address corresponding to the predetermined range of the data stored by the host data memory section; and
the storage device storing the write data specified by the write request, in the host data memory section.

16. The method of controlling the storage system according to claim 15, wherein the communication controller sending a response to the write request to a unicast address of the host computer.

17. The method of controlling the storage system according to claim 15, wherein the write request to the multicast address is encrypted with a cypher key corresponding to the multicast address.

18. The method of controlling the storage system according to claim 15, wherein
when the host computer provides services for many tenants by using the host data, the write request to the multicast address is encrypted with a cypher key corresponding to one of the tenants concerning the write request.

19. The method of controlling the storage system according to claim 15, wherein
when the host computer provides services for many tenants by using the host data,
the host computer notifying to the storage device, a range of the host data section to be stored in the storage device and an offset value for each tenant,
the storage device storing data in a range calculated by adding the offset value for each tenant to the range notified by the host computer, and
the storage device receiving a write request to a multicast address corresponding to the calculated range including the offset value.

* * * * *